July 3, 1934.  F. ZABACH  1,965,401
BINDING POST
Original Filed Nov. 26, 1930
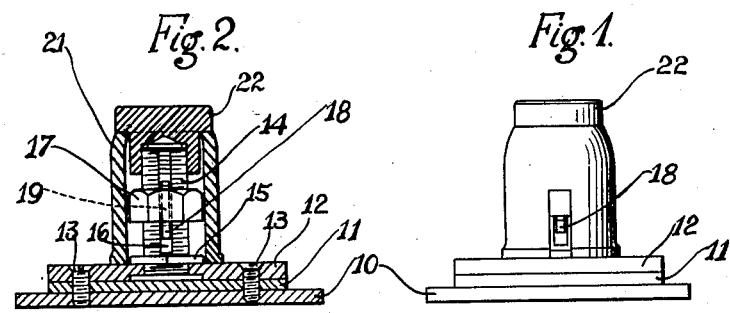
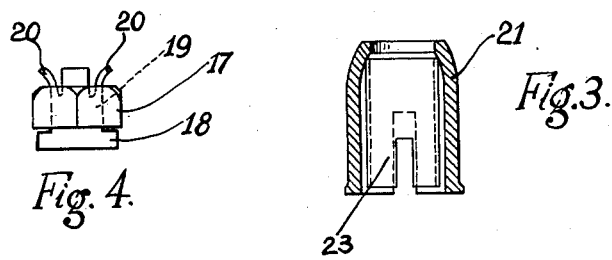
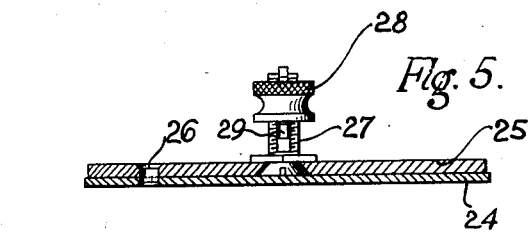
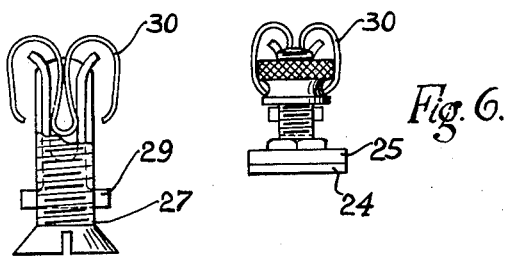
Florian Zabach
INVENTOR.
BY Erich F. Michaelis
ATTORNEY.

Patented July 3, 1934

1,965,401

UNITED STATES PATENT OFFICE 1,965,401

BINDING POST

Florian Zabach, Chicago, Ill.

Application November 26, 1930, Serial No. 498,244
Renewed January 10, 1934

2 Claims. (Cl. 173—259)

The invention relates to binding post and the object of the invention is, to provide a binding post in which a plurality of electric wires may be easily and securely inserted and clamped together.

Another object of the invention is to provide a binding post consisting of a screw or the like, in which an axial slot is cut, and having a nut adjustable thereon, which is adapted to move a cross bar upwardly and downwardly inside of said slot.

Other objects of the invention, not specifically mentioned may be easily ascertained and understood from the following description in connection with the accompanying drawing forming a part thereof. It is however to be understood, that the invention is not to be limited or restricted to the exact construction or formation shown in the drawing and described in the specification, but that said invention is only to be limited by the scope of the claims appended hereto.

In the drawing illustrating some preferred embodiment of the invention

Fig. 1 is a side view of the binding post protected by an insulation cap, according to the present invention.

Fig. 2 is a vertical cross section of Fig. 1.

Fig. 3 is a cross section through the insulation cap, having an insulation tube inserted therein.

Fig. 4 is a side view of a nut, used in connection with the binding post according to the present invention, and a clamping bar movably attached to said nut.

Fig. 5 is a clamping binding post according to the present invention of a somewhat modified form shown on a base.

Fig. 6 is an elevation of a binding post similar to the one shown in Fig. 5, having a locking spring attached thereto and Fig. 7 is an enlarged view of the binding post proper shown in Fig. 6, but removed from its space and having the nut removed from the binding post but showing the locking spring in position.

The base shown in the drawing does not form any part of the present invention, and is only shown in order to facilitate the understanding of the invention and of the manner in which said invention is being used. According to Figs. 1 and 2 a bottom plate 10 is provided, made from any suitable metal or the like. On said base plate an insulation plate 11 rests, and on top of this first insulation plate a second insulation plate 12 is arranged. The three plates may be held together by means of screws 13. The upper insulation plate 12 is provided with a bore and a counterbore to receive a bolt or screw 14, having a shallow flat head which fits into the counterbore. A counternut 15 is screwed onto said bolt and holds the bolt in position on the upper insulation plate. After the bolt is arranged in position, the two insulation plates and the base plates are fastened to each other. A slot 16 extends lengthwise and diametrically of the bolt practically over the length of said bolt, and is adapted to receive a plurality of electrical conductors, which are to be contacted with each other. After the wires which are not shown in the drawing are inserted into the slot 16, a nut 17 is screwed upon the bolt 14, and may be forced downwardly until it engages the wires in the slot and presses them against each other. In this way the electrical conductors are held securely in the slots, and in contact with the bolt and with each other. The pressure of the nut however is only exerted on the parts of the wires outside of the slot. In order to increase the contact surfaces of the electrical wires and force the wires more firmly against each other, a cross bar 18 may be inserted into the slot 16, above the wires located in said slot so, that said cross bar will be forced downwardly against the wires in the slot and will force these wires against each other, and against the binding post bolt, whereby a very good contact is obtained.

In order to prevent the cross bar 18 from falling out of the slot 16 and from getting lost an upright portion 19 may be formed on the cross bar as an integral part thereof so, that the entire member has the shape of a T. The upright part of this T shaped member fits into the hole in the nut 17, and some side portions 20 of said upright part may be bent over laterally of said upright part as clearly shown in Fig. 4. In this manner the clamping bar 18 is securely attached to the nut 17, so that it can not accidentally drop out of the slot 16 and will be moved upwardly and downwardly together with the nut 17.

In order to insulate the binding post and to protect persons coming against said binding post, an insulation cap is provided. This insulation cap consists of a tubular body portion 21 fitting over the assembled binding post, and resting on the top insulation plate. This tubular member is provided with two slots extending from the bottom of the member upwardly and arranged diametrically opposite of each other, so that the wires arranged in the binding post can extend through the slots in the tubular member. The tubular member is held in position, and closed on its top by the second element of the insulation cap, a screw plug 22 which is provided with a female thread adapted to engage the upper end of the bolt 14.

If desired an insulation tube 23 of a thin insulation material may be inserted in the tubular member 21. This additional insulation part is then also provided with a pair of slots extending upwardly from the bottom and arranged diametrically opposite to each other.

In the Figs. 5, 6, and 7 a smaller binding post is shown the construction of which is practically the same as the construction of the binding post described above.

In Figs. 5 and 6, a pair of insulation plates 24 and 25 respectively are connected with each other by means of rivets 26 or the like. The upper insulation plate 25 is provided with a hole, which is countersunk from its lower surface, so that a countersunk flat head screw 27 may be inserted in this hole, and may be held between the two insulation plates, as shown in Fig. 5. The screw is provided with a longitudinal slot extending practically over the entire length of the screw, and diametrically thereof. A curled nut 28 is adapted to be screwed upon the screw 27, and to clamp electrical conductors (not shown) which are inserted in said slot tightly and firmly together. In order to improve the contact between the electrical conductors and the binding post a clamping member 29 is provided, having the shape of an inserted T. The upright part of the T is split lengthwise, and the two parts obtained in this manner are bent off, after the clamping member is inserted into the nut 28. When the nut is then fastened onto the screw, the cross piece of the clamping member will slide upwardly and downwardly with the nut and will, when said nut is tightened on said screw be forced downwardly to clamp the wires firmly together, and against the binding post.

In order to secure the nut against being accidentally loosened from the screw after being forced downwardly into clamping position an M shaped spring 30 may be inserted with its middle portion into the slot, and between the bent apart portions of the upward part of the clamping member 29. The outer legs or elements of said spring will then engage the nut so that the same can not rotate accidentally.

Having described my invention and how the same is to be performed, I claim as new and desire to secure by Letters Patent:—

1. In a device of the class described, a threaded binding post, having a vertically and diametrically extending slot therein, a cross bar adapted to be slidably arranged in said slot and having a portion extending at right angles to said bar, a nut adapted to be screwed upon said post, and receive the upwardly extending part of the cross bar, parts of said upwardly extending portion being bent over after said portion is received by the nut, said bent over portions preventing the cross bar from accidental removal from said nut and a spring, adapted to be inserted into the slot and to secure the nut against accidental movement relative in the post.

2. In a device of the class described, an insulation plate, a threaded binding post thereon having a vertically and diametrically extending slot therein, adapted to receive electrical conductors, a nut adapted to be screwed upon said binding post and to engage said electrical conductors and force the same against the end of said slot, a tubular insulation member adapted to surround the binding post, to rest upon the insulation plate and having a pair of slots extending from the bottom upwardly and arranged diametrically opposite each other, and a screw cap provided with a female thread adapted to engage the threaded binding post and to engage and close the upper end of the insulation member.

FLORIAN ZABACH.